(12) United States Patent
Bamji

(10) Patent No.: US 7,791,715 B1
(45) Date of Patent: Sep. 7, 2010

(54) METHOD AND SYSTEM FOR LOSSLESS DEALIASING IN TIME-OF-FLIGHT (TOF) SYSTEMS

(75) Inventor: Cyrus Bamji, Fremont, CA (US)

(73) Assignee: Canesta, Inc., Sunnyvale, CA (US)

( * ) Notice: Subject to any disclaimer, the term of this patent is extended or adjusted under 35 U.S.C. 154(b) by 182 days.

(21) Appl. No.: 11/906,609

(22) Filed: Oct. 2, 2007

Related U.S. Application Data

(60) Provisional application No. 60/848,832, filed on Oct. 2, 2006.

(51) Int. Cl.
*G01C 3/08* (2006.01)
(52) U.S. Cl. .................. 356/5.1; 356/4.01; 356/5.01
(58) Field of Classification Search ............. 356/4.01, 356/5.01, 5.1
See application file for complete search history.

(56) References Cited

U.S. PATENT DOCUMENTS

2005/0156121 A1 * 7/2005 Bamji et al. ............. 250/492.2

2008/0100822 A1 * 5/2008 Munro ...................... 356/4.01

* cited by examiner

*Primary Examiner*—Isam Alsomiri
(74) *Attorney, Agent, or Firm*—Canesta, Inc.; Michael A. Kaufman

(57) ABSTRACT

Time-of-flight (TOF) phase-derived data is dealiased by operating the TOF system using at least two close-together modulation frequencies $f_1$ and $f_2$ that are close to the TOF system maximum modulation frequency $f_m$. On one hand, phase data acquired by the TOF is associated with a desirably long aliasing interval range $Z_{AIR}$ normally associated with a rather low modulation frequency. On the other hand, phase data acquired by the TOF system is also associated with the high precision certainty as to Z value normally associated with high modulation frequency. Preferably the TOF system operates always close to $f_m$ such that TOF operating efficiency is high, and system signal/noise ratio is not substantially degraded using the present invention.

20 Claims, 6 Drawing Sheets

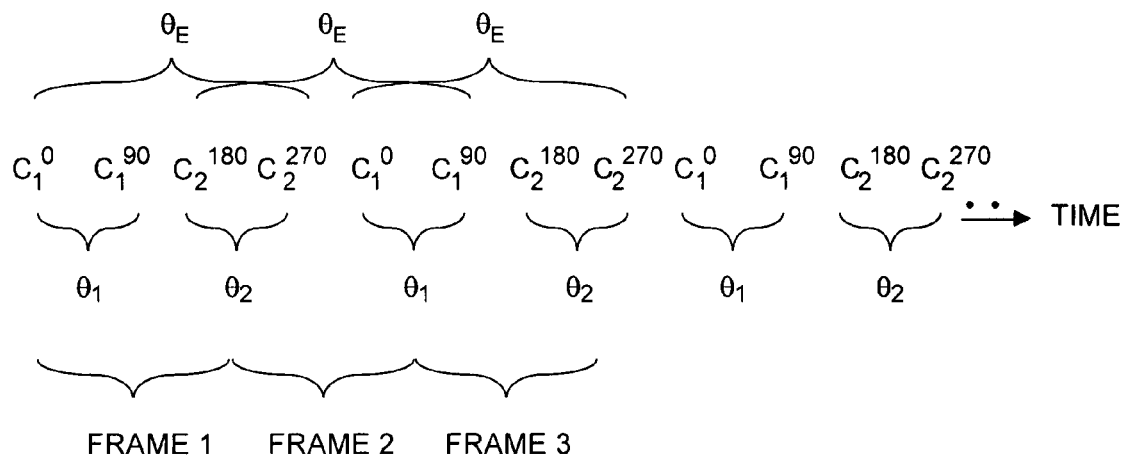
FIG. 4D
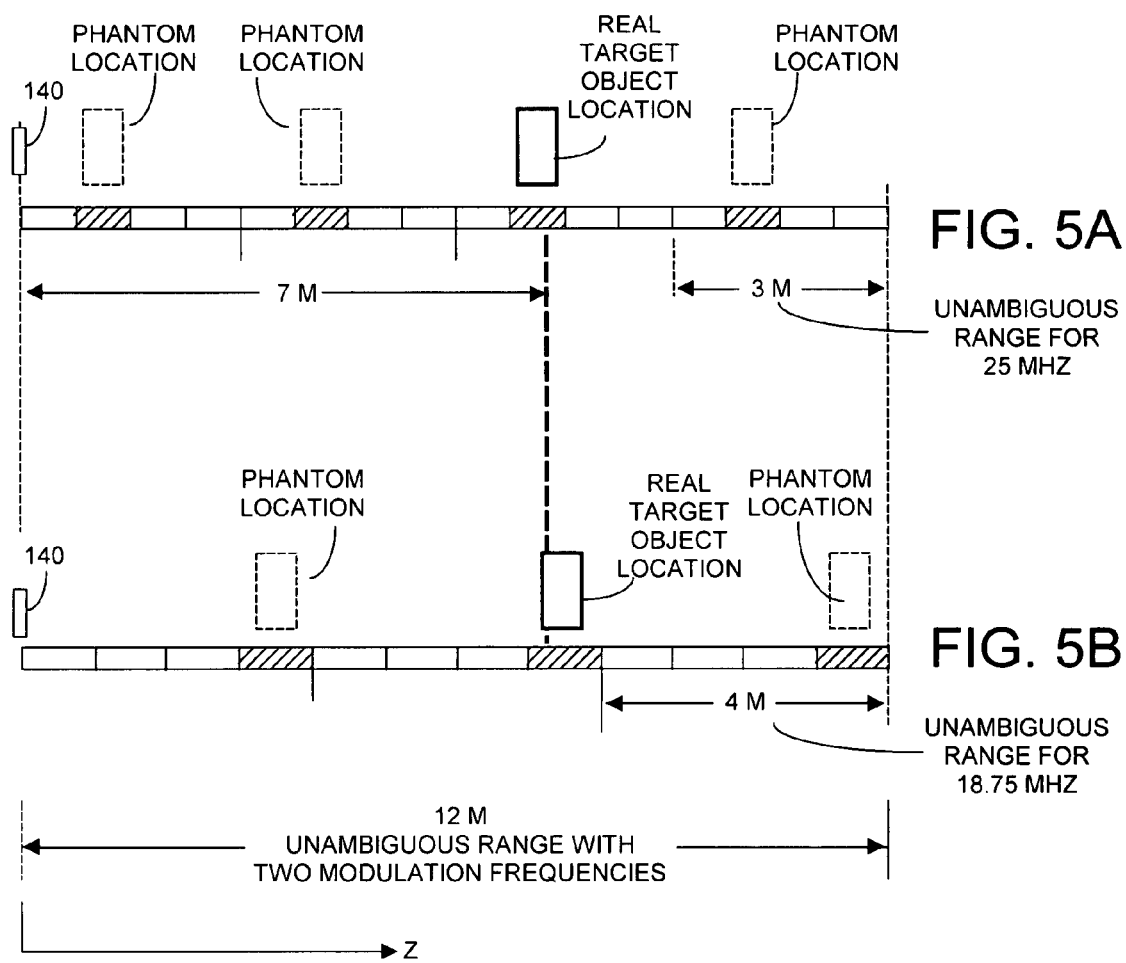
FIG. 5A
FIG. 5B

METHOD AND SYSTEM FOR LOSSLESS DEALIASING IN TIME-OF-FLIGHT (TOF) SYSTEMS

RELATION TO CO-PENDING APPLICATION

Priority is claimed to co-pending U.S. provisional patent application Ser. No. 60/848,832 filed 2 Oct. 2006 entitled Method and System for Lossless Dealiasing.

FIELD OF THE INVENTION

The invention relates generally to depth imaging systems, and more particularly to time-of-flight (TOF) imaging system that acquire depth images by comparing phase shift between emitted optical energy and reflected detected optical energy.

BACKGROUND OF THE INVENTION

Modern time-of-flight (TOF) systems can ascertain depth distances to a target object by emitting modulated optical energy of a known phase, and examining phase-shift in the optical signal reflected from the target object. Exemplary such phase-type TOF systems are described in several U.S. patents assigned to Canesta, Inc., assignee herein, including U.S. Pat. Nos. 6,515,740 "Methods for CMOS-Compatible Three-Dimensional Imaging Sensing Using Quantum Efficiency Modulation", 6,906,793 entitled Methods and Devices for Charge Management for Three Dimensional Sensing, 6,678,039 "Method and System to Enhance Dynamic Range Conversion Useable With CMOS Three-Dimensional Imaging", 6,587,186 "CMOS-Compatible Three-Dimensional Image Sensing Using Reduced Peak Energy", 6,580,496 "Systems for CMOS-Compatible Three-Dimensional Image Sensing Using Quantum Efficiency Modulation".

As the present invention is used with such prior art phase-type TOF systems, it is useful at this juncture to review their operation. FIG. 1A is based upon the above-referenced patents, e.g. the '186 patent, and depicts an exemplary phase-type TOF system.

In FIG. 1A, exemplary phase-shift TOF depth imaging system 100 may be fabricated on an IC 110 that includes a two-dimensional array 130 of pixel detectors 140, which pixel detectors may be single-ended or differential in operation. Preferably each of the pixel detectors 140 has dedicated circuitry 150 for processing detection charge output by the associated detector. IC 110 preferably also includes a microprocessor or microcontroller unit 160, memory 170 (which preferably includes random access memory or RAM and read-only memory or ROM), a high speed distributable clock 180, and various computing and input/output (I/O) circuitry 190. Among other functions, controller unit 160 may perform distance to object and object velocity calculations.

Under control of microprocessor 160, optical energy source 120 is periodically energized by an exciter 115, and emits modulated optical energy toward an object target 20. Emitter 120 preferably is at least one LED or laser diode(s) emitting low power (e.g., perhaps 1 W) periodic waveform, producing optical energy emissions of known frequency (perhaps a few dozen MHz) for a time period known as the shutter time (perhaps 10 ms). Typically emitter 120 operates in the near IR, with a wavelength of perhaps 800 nm. A lens 125 is commonly used to focus the emitted optical energy.

Some of the emitted optical energy (denoted $S_{out}$) will be reflected (denoted $S_{in}$) off the surface of target object 20. This reflected optical energy $S_{in}$ will pass through an aperture field stop and lens, collectively 135, and will fall upon two-dimensional array 130 of pixel or photodetectors 140. When reflected optical energy $S_{in}$ impinges upon photodetectors 140 in array 130, photons within the photodetectors are released, and converted into tiny amounts of detection current. For ease of explanation, incoming optical energy may be modeled as $S_{in}=A\cdot\cos(\omega t+\theta)$, where A is a brightness or intensity coefficient, $\omega\cdot t$ represents the periodic modulation frequency, and $\theta$ is phase shift. As distance Z changes, phase shift $\theta$ changes, and FIGS. 1B and 1C depict a phase shift $\theta$ between emitted and detected signals. The phase shift $\theta$ data can be processed to yield desired Z depth information. Within array 130, pixel detection current can be integrated to accumulate a meaningful detection signal, used to form a depth image. In this fashion, TOF system 100 can capture and provide Z depth information at each pixel detector 140 in sensor array 130 for each frame of acquired data.

Signal detection within phase-type TOF systems such as system 100 is described more fully later herein with respect to FIG. 2B, but in brief, pixel detection information is captured at least two discrete phases, preferably 0° and 90°, and is processed to yield Z data.

System 100 yields a phase shift A at distance Z due to time-of-flight given by:

$$\theta=2\cdot\omega\cdot Z/C=2\cdot(2\cdot\pi\cdot f)\cdot Z/C \quad (1)$$

where C is the speed of light, 300,000 Km/sec. From equation (1) above it follows that distance Z is given by:

$$Z=\theta\cdot C/2\cdot\omega=\theta\cdot C/(2\cdot 2\cdot f\cdot\pi) \quad (2)$$

And when $\theta=2\cdot\pi$, the aliasing interval range associated with modulation frequency f is given as:

$$Z_{AIR}=C/(2\cdot f) \quad (3)$$

In practice, changes in Z produce change in phase shift $\theta$ but eventually the phase shift begins to repeat, e.g., $\theta=\theta+2\cdot\pi$, etc. Thus, distance Z is known modulo $2\cdot\pi\cdot C/2\cdot\omega)=C/2\cdot f$, where f is the modulation frequency. Thus there can be inherent ambiguity between detected values of phase shift $\theta$ and distance Z, and multi-frequency methods are employed to disambiguate or dealias the phase shift data. Thus, if system 100 reports a distance $Z_1$, in reality the actual distance may be any of $Z_N=Z_1+N\cdot C/2f$, where N is an integer. The nature of this ambiguity may be better understood with reference to FIGS. 1D and 1E.

FIG. 1D is a mapping of detected phase $\theta$ versus distance Z for system 100. Assume that system 100 determines a phase angle $\theta'$ for target object 20, where this phase information was acquired with a modulation frequency $f_1$ of say 50 MHz. As shown by FIG. 1D, there are several distances, e.g., $z_1$, $z_2$, $z_4$, $z_5$, etc. that could be represented by this particular phase angle ... but which is the correct distance? In FIG. 1D, $Z_{AIR1}$ represents the Z distance aliasing interval range associated with z data acquired at frequency $f_1$, and is the distance from $z_1$ to $z_2$, or $z_2$ to $z_4$, or $z_4$ to $z_5$, etc. These various $z_1$, $z_2$, $z_4$, $z_5$, distances are ambiguous and require disambiguation or dealiasing to identify the correct distance value.

It is desired to dealias the z data by increasing magnitude of the aliasing interval range $Z_{AIR1}$. One prior art approach does this by increasing the ratio C/2f, which is to say, by decreasing the modulation frequency f, see equation (3). FIG. 1D also shows, in bold line, phase data acquired for a lower modulation frequency $f_2$. In FIG. 1D, $f_2$ is perhaps 20 MHz, in that the slope $d\theta/dz$ for the $f_2$ waveform is less than about half the slope for the $f_1$ waveform, where the slope $d\theta/dz$ is proportional to modulation frequency $f_m$. FIG. 1E is a polar representation in which a vector, depicted as a line rotating counter-clockwise, rotates with velocity $\omega=d\theta/dt=2\pi f$. In prior art system 100, data is captured from pixel detectors at least two discrete phases, e.g., 0° and 180°.

Thus in FIG. 1D, when the lower modulation frequency $f_2$ is employed, the candidate distance values represented by phase θ' are $z_3$, $z_6$, etc. As seen in FIG. 1D, the aliasing interval range $Z_{AIR2}$ has advantageously increased from a short range $Z_{AIR1}$ (associated with faster modulation frequency $f_1$) to a greater range $Z_{AIR2}$. The ratio of the aliasing interval range increase will be the ratio $f_2/f_1$. But acquiring phase data with lower modulation frequency $f_2$ yields a Z value with less precision or resolution than if acquired with higher modulation frequency $f_1$. This imprecision occurs because the slope of the curve for frequency $f_2$ is about half the slope for modulation frequency $f_1$. Thus errors in the measurement of phase acquired at $f_2$ translate to greater errors in Z than errors in phase acquired at $f_1$. For the same signal/noise ratio, errors in phases acquired at f1 and at f2 will be the same, but the corresponding uncertainty errors in Z use phase acquired at the lower $f_2$ modulation frequency will be about twice as large for the representation of FIG. 1D. Thus, all things being equal, lowering the modulation frequency undesirably results in lower resolution (greater uncertainty) in accurately determining Z.

Thus while increasing the aliasing range interval is desired, doing so by decreasing the modulation frequency f is not desirable. This modulation frequency decrease approach to dealiasing is wasteful since lower modulation frequency means lower pixel sensor 140 accuracy per watt of illumination power from emitter 120 (see FIG. 1A). For example, a reduction of modulation frequency by a factor of 2.5, say from f=50 MHz to f=20 MHz, will advantageously increase the aliasing interval by the same factor, e.g., from 3 m to 7.5 m, but the penalty is a substantial (2.5)·(2.5)=6.25× increase in operating power to achieve similar uncertainty performance, assuming effects of ambient sunlight can be ignored. By way of further example, if modulation frequencies of 50 MHz and 10 MHz were used, the dealiasing range would increase from 3 m to 30 m, but at a 25× increase in operating power for the same level of uncertainty. Thus, in practice dealiasing a TOF system simply by lowering the modulation frequency is accompanied by a very substantial performance penalty.

What is needed for a phase-type TOF system is a method of dealiasing in a relatively lossless fashion, e.g., disambiguation of Z data results, but without the large performance penalty associated with prior art dealiasing approaches. Preferably such relatively lossless dealiasing should enable the TOF system to operate most of the time near its maximum modulation frequency, to help maintain system performance.

The present invention provides a method and system for dealiasing in phase-type TOF systems.

SUMMARY OF THE PRESENT INVENTION

The present invention dealiases data acquired from a phase-type TOF range finding system that has a maximum operable modulation frequency $f_m$ and determines Z distance to a target object by comparing differences in phase between emitted and received optical energy. The present invention uses at least first and second modulation frequencies $f_1$ and $f_2$ to acquire phase data, where frequency $f_1$ is perhaps within 40% of frequency $f_m$ and preferably even closer to $f_m$, and where $f_2 < f_1$ and is within about 35% of the frequency of $f_1$, and preferably closer to $f_1$.

TOF phase data acquired using modulation frequency $f_1$ and using modulation frequency $f_2$ is processed to produce a dealiasing frequency $f_D$ that is preferably proportional to a function of ($f_1$ and $f_2$) such that $f_D \ll f_m$. The TOF phase data is also processed to produce an effective operating frequency $f_E$ that is preferably greater in frequency than $f_2$, and in some embodiments may be intermediate $f_1$ and $f_2$.

In one aspect of the present invention, the TOF system performs as though phase data were acquired at a relatively low modulation frequency $f_D$. As such, the TOF system advantageously produces an effective aliasing interval range of $Z_{DAIR}$ that is commensurate with TOF system operation at $f_D$. Further, $Z_{DAIR}$ is larger than the aliasing range interval that would be obtained using either $f_1$ or $f_2$ alone and thus facilitates rapidly learning an approximate value for Z.

In a second aspect of the present invention, the TOF system performs with enhanced precision as though phase data were acquired at the relatively high modulation frequency $f_E$. As such, resolution certainty of distance Z range values is that of a system with relatively high modulation frequency $f_E$ and can approach the performance of the TOF system operating at all times at the highest modulation frequency $f_m$. As used herein, a high level of resolution certainty means that jitter or uncertainty in the acquired Z data due to noise and other errors is low.

Phase data acquired by the TOF system can be processed and combined in various sequence combinations, using different methodologies to produce virtual frequencies $f_E$ and $f_D$. Regardless of how frequencies $f_E$ and $f_D$ are mathematically produced, the resultant TOF system exhibits a good aliasing interval range commensurate with a low modulation frequency $f_D$, and exhibits a low level of resolution uncertainty commensurate with high modulation frequency $f_E$ operation, while preserving frame rate. Dealiasing according to several embodiments of the present invention is lossless in the sense that there is a very small performance penalty in carrying out the dealiasing process, namely additional digital readouts from detectors in the TOF system.

Other features and advantages of the invention will appear from the following description in which the preferred embodiments have been set forth in detail, in conjunction with their accompanying drawings.

BRIEF DESCRIPTION OF THE DRAWINGS

FIG. 4D depicts a sequence for which direct computation of $\theta_E$ is made, as well as depicting resultant phase shift and frame construction, according to an embodiment of the present invention;

FIGS. 5A and 5B depict target object locations, real and phantom, determined using two modulation frequencies, according to a least common multiple dealiasing embodiment of the present invention.

DETAILED DESCRIPTION OF THE PREFERRED EMBODIMENT

Figure 1A:
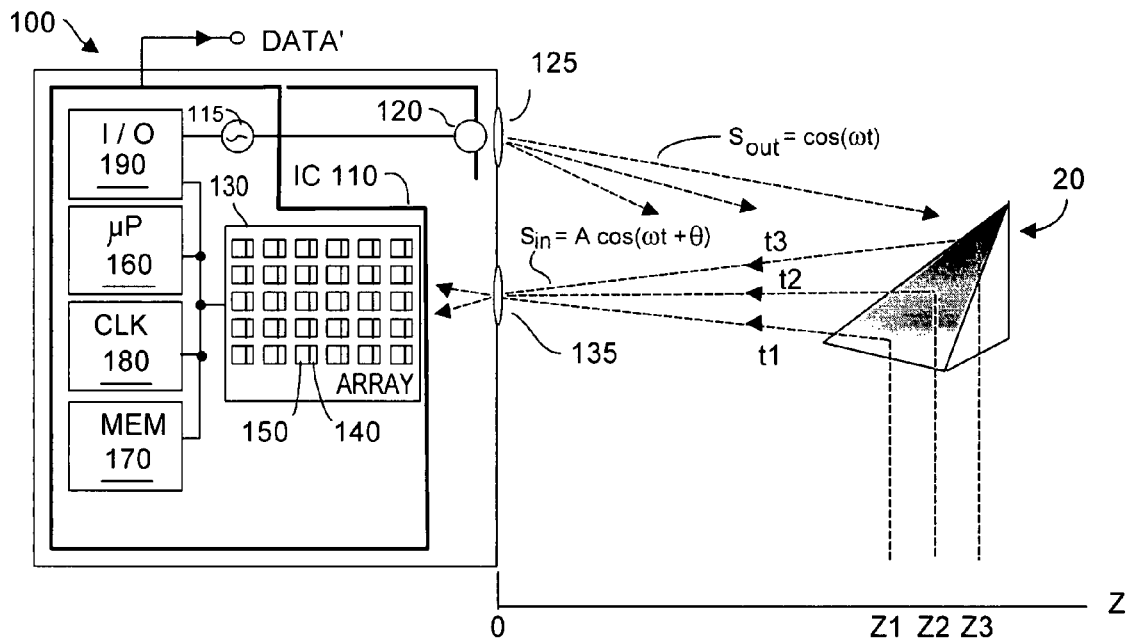
FIG. 1A is a block diagram depicting a phase-type time-of-flight three-dimensional imaging system, according to the prior art.
Figure 1B:
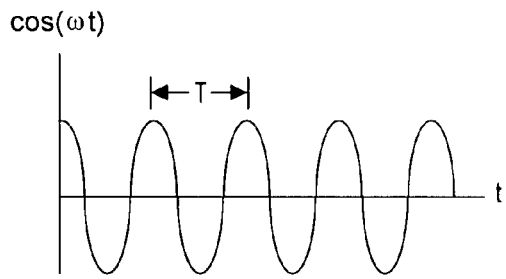
FIGS. 1B and 1C depict emitted and reflected optical energy waveforms associated with the imaging system of FIG. 1A, according to the prior art.
Figure 1C:
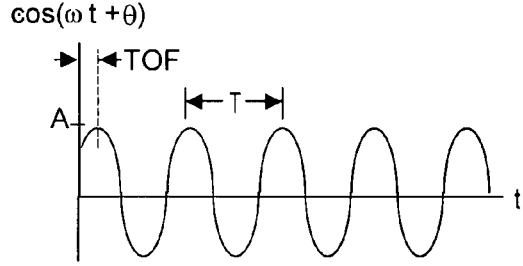
Figure 2A:
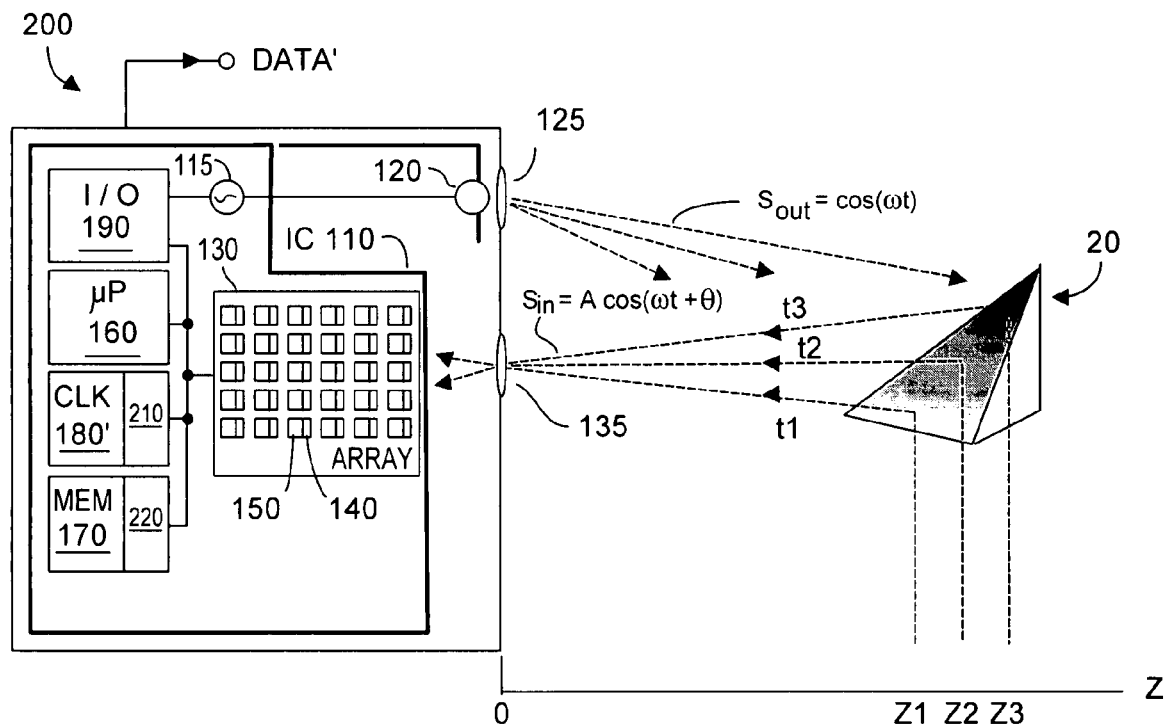
FIG. 2A depicts a phase-type time-of-flight three-dimensional imaging system with dealiasing, according to embodiments of the present invention.

FIG. 2A depicts a phase-type TOF system 200 similar to that described with respect to FIGS. 1A-1C, except that additional components 210 and software 220 are included to implement the present invention. As such, software 220 and 210 may be considered as a dealiasing subsystem for TOF system 200. Output DATA' may include information provided as DATA by TOF system 100 in FIG. 1A. A TOF system such as system 100 (FIG. 1A) or 200 (FIG. 2A) normally is operable at some maximum modulation frequency $f_m$, perhaps 100 MHz. This is not to say that the system cannot be operated at a modulation frequency greater than $f_m$, but it is realized that at such higher modulation frequencies, system performance ultimately degrades. Thus, it is understood that $f_m$ denotes the highest modulation frequency at which the system is normally operable, and not the highest modulation frequency at which it can be operated.

Figure 2B:
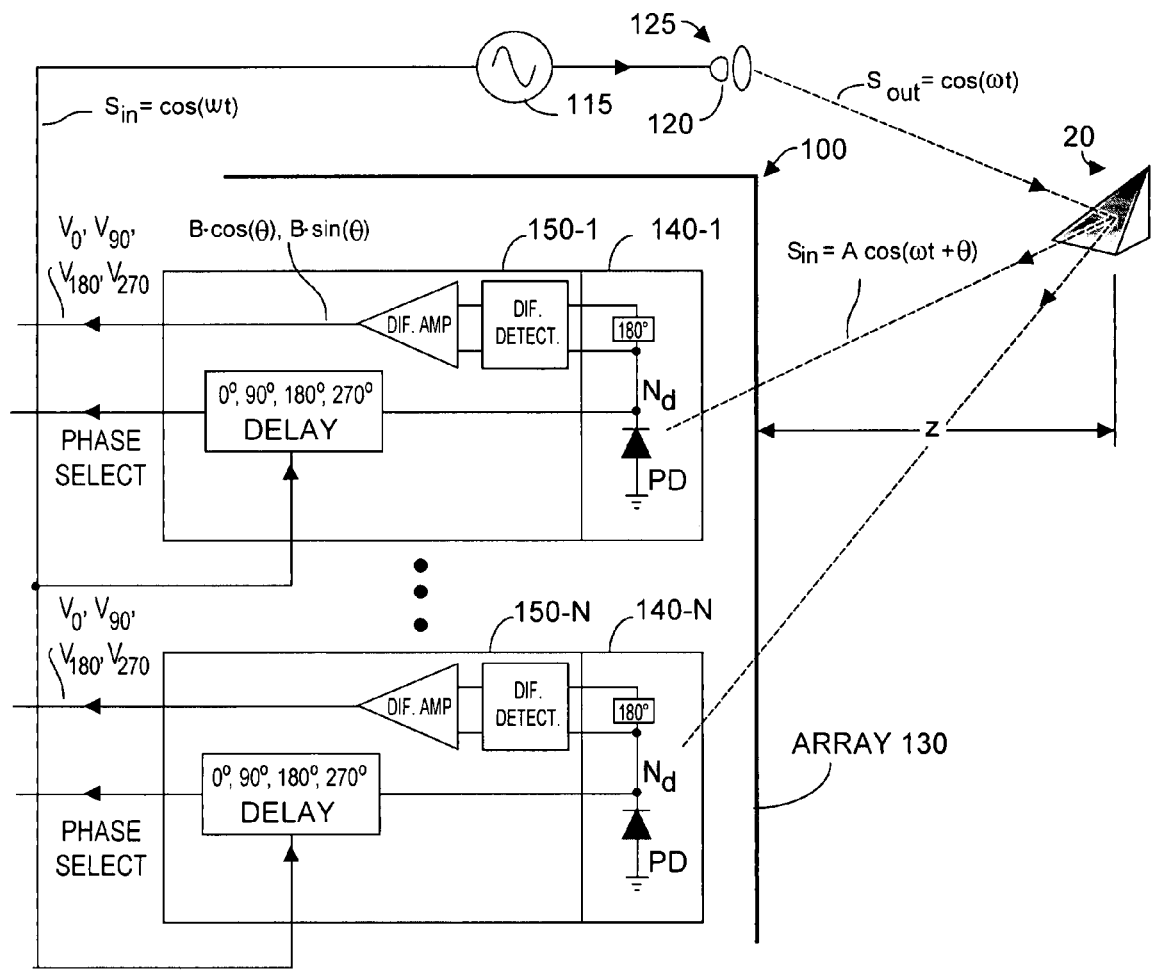
FIG. 2B depicts details of exemplary phase capture at 0° and 180°, 90° and 270°, according to embodiments of the present invention.

Before describing dealiasing operation of system 200, it is useful to briefly describe multiphase detection with reference to FIG. 2B, which shows two of the many photodetectors PD in array 130, namely photodetectors 140-1, and 140-N, as well as some of their associated electronics, namely 150-1, 150-N. This particular embodiment employs quantum efficiency (QE) modulated differential photodetectors or pixels 140, whose pixel detection information is captured at least two discrete phases 0° and 90°, and more preferably four discrete phases 0° and 180°, and 90° and 270°. These discrete phase operations of the pixel detectors are not to be confused with the phase shift data θ that is sought to be detected. These discrete phases represent shift between modulator 115 and optical energy emitter 120, whereas the phase shift data θ that is sought to be detected is shift between emitted optical energy $S_{out}$ from emitter 120, and pixel detectors 140 in array 130 (see FIG. 2A).

The detection phase data that is captured at the discrete phases is denoted herein as captures $C^0$ and $C^{180}$, $C^{90}$ and $C^{270}$ and is processed to implement dealiasing according to the present invention. Acquisition using four phases is preferred so as to remove so-called fixed pattern offset. The $C^0$ acquisition yields data but may include an error offset from zero, e.g., the value $C^0$ may not be zero when there is no signal to be detected. By the same token, the $C^{180}$ acquisition should have the same, but inverted, data and will have the same fixed pattern offset. Advantageously by subtracting ($C^0-C^{180}$) and preferably also subtracting ($C^{90}-C^{270}$) phase and Z data information is preserved but the fixed pattern offset is canceled out. However the present invention may be used to dealias multiphase TOF data that is obtained from single-ended phase detectors, as well as from detection systems that do not employ QE modulation detection.

Phase angle θ can be computed from captures $C^0$, $C^{90}$, $C^{180}$, $C^{270}$, as follows:

$$\theta = \alpha \tan 2(C^{90}-C^{270}, C^0-C^{180}) \quad (4)$$

where a tan 2(X,Y) is the trigonometric function corresponding to a tan (Y/X)

The configuration and operation of what is shown in FIG. 2B is similar to what is described with respect to the fixed phase delay embodiment of FIG. 10 in earlier-referenced U.S. Pat. Nos. 6,580,496 and 7,906,793. In FIG. 2B, detection-generated photocurrent from each QE-modulated differential pixel detector, e.g., 140-1, is differentially detected (DIF. DETECT) and differentially amplified (AMP) to yield signals B·cos(θ), B·sin(θ), where B is a brightness coefficient, A fixed discrete 0° or 90° phase shift delay (DELAY), and more preferably a fixed 0° or 180 or 90° or 270° phase shift is switchably insertable responsive to a phase select control signal (PHASE SELECT) that can be commanded by clock unit 180'. Phase data, e.g., $C^0$ and $C^{180}$, $C^{90}$ and $C^{270}$, is acquired or captured from the pixel detectors at these discrete phases. A more detailed description of such phase detection may be found in the above-referenced patents, but without limitation, the fixed discrete phase shifts may be inserted by clock unit 180', whose signal is used to drive detector array 130, or may be introduced by modulator 115; see FIG. 2B.

As will now be described, the present invention combines preferably close together modulation frequencies $f_1$ and $f_2$, each typically less than the system maximum modulation frequency $f_m$) and the resultant phase data acquired from each, denoted $\theta_1$ and $\theta_2$, to provide two goals: (1) obtaining the equivalent of a high modulation frequency measurement from system 200 that yields a low level of Z resolution uncertainty, and (2) obtaining the equivalent of a low modulation frequency measurement from system 200 that provides a long aliasing interval Z range. In this fashion the approximate Z range is determined from the long aliasing interval, while more precise determination of the Z value is determined from the high modulation frequency measurement.

Referring back to FIG. 2A, software 220 when executed by processor 160 can alter normal operation of clock circuit 180' by virtue of components 210. More specifically, in embodiments of the present invention, system 200 is thus caused to operate using at least first and second frequencies $f_1$, $f_2$, where $f_1>f_2$, $f_1$ is close to $f_m$, preferably within about 40% or less of $f_m$, and f2 is within about 35% of $f_1$ and preferably closer. Thus $f_1$ may be said to lie in a range of about 60% to 100% of the frequency of $f_m$ such that if $f_m$ were say 100 MHz, then $f_1$ would have a frequency of about 60 MHz to as high as 100 MHz. Similarly the range of $f_2$ is about 65% to about 99% the frequency such that if $f_1$ was say 90 MHz, then $f_2$ would have a frequency of about 58.5 MHz to about 89.1 MHz.

According to the present invention, the use of modulation frequencies $f_1$ and $f_2$ will cause system 200 to behave with respect to dealiasing interval as though phase data were collected while system 200 was being operated at a very slow modulation frequency $f_D$ that preferably is proportional to ($f_1-f_2$). For example, assume that operation of system 200 at modulation frequency $f_1$ provides an aliasing interval range $Z_{AIR1}$ and that operation of system 200 at modulation frequency $f_2$ provides an aliasing interval range $Z_{AIR2}$. Embodiments of the present invention process data acquired at modulation frequency $f_1$ and at modulation frequency $f_2$ to provide an effective aliasing interval range $Z_{AIRD}>Z_{AIR2}Z_{AIR1}$.

Further, according to the present invention, the use of preferably close together modulation frequencies $f_1$ and $f_2$ advantageously produces good resolution precision of Z measurements as though system 200 were collecting phase data operating with a high effective modulation frequency close to $f_m$, perhaps $(f_1+f_2)/2$ or other combination of $f_1$ and $f_2$. It is noted that the frequencies $(f_1-f_2)$, $(f_1+f_2)/2$ and other combinations of these modulation frequencies are really mathematical constructs or virtual frequencies, and system 200 does not physically operate at those virtual frequencies. Of course it is understood that more than two modulation frequencies $f_1$, $f_2$ may be used, which different modulation frequencies preferably are close in frequency to each other and to $f_m$. However using multiple modulation frequencies according to embodiments of the present invention also results in Z resolution certainty or precision that is better than would be achieved if the TOF system processed data acquired solely while operating at modulation frequency $f_1$ and disregarded data acquired at modulation frequency $f_2$, or operated at modulation frequency $f_2$ and disregarded data acquired at modulation frequency $f_1$.

Figure 3:
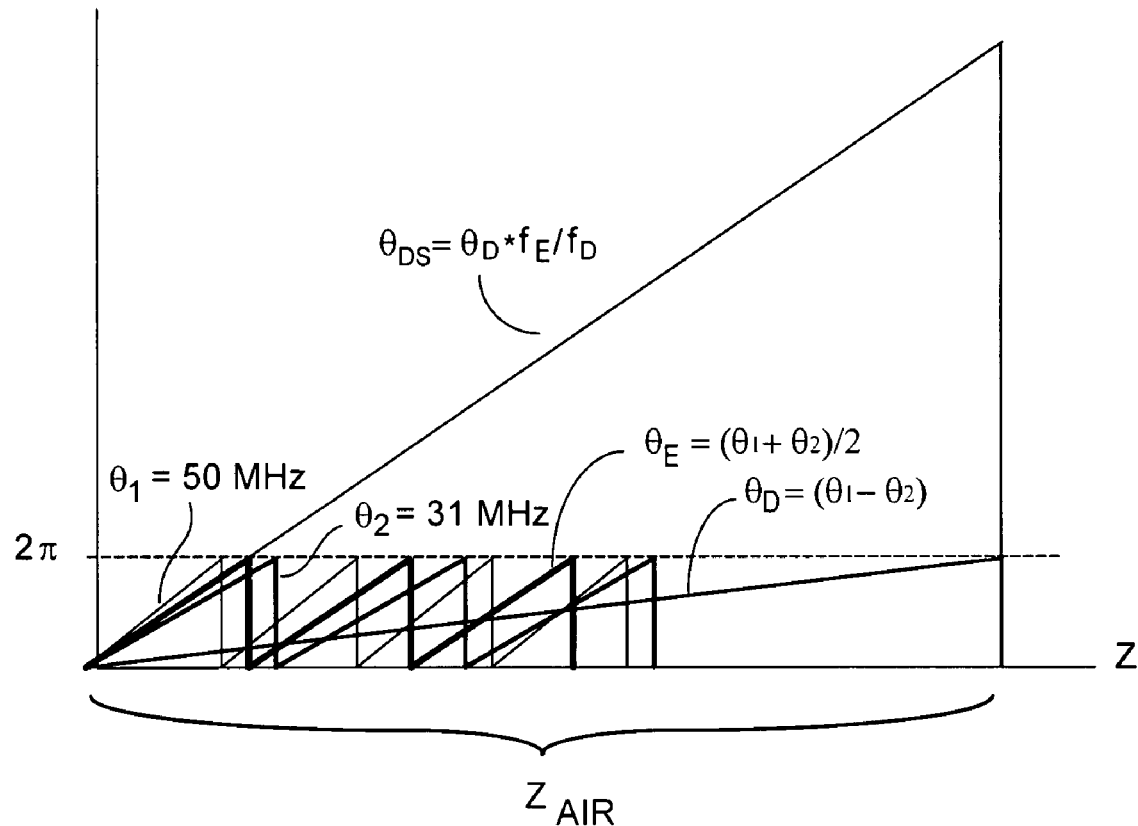
FIG. 3 acquired phase-vs-distance Z for two close modulation frequencies, and for virtual frequencies $f_D$, $f_E$, and $f_{DS}$, and resultant large aliasing interval $Z_{AIR}$, according to embodiments of the present invention.

As will be appreciated from what is shown in FIG. 3, in contrast to prior art dealiasing wherein $f_m$ is decreased with loss of system efficiency, the present invention operates system 200 at high frequency, preferably close to $f_m$, which maintains high operating system efficiency. Further, because modulation frequencies $f_1$ and $f_2$ preferably are close to each other and to $f_m$, phase information captured by pixel detectors 140 at one modulation frequency may be shared with data frames captured at the other modulation frequency (or frequencies, if more than two modulation frequencies are employed).

Figure 1D:
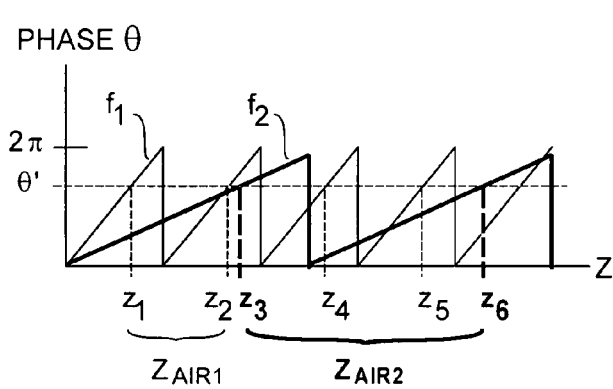
FIG. 1D depicts acquired phase-vs-distance Z for two modulation frequencies and demonstrates aliasing intervals, and distance ambiguity, according to the prior art.

FIG. 3 is a plot of phase versus distance Z, according to the present invention. A waveform is shown for phase data acquired using first modulation frequency $f_1$, which data is denoted $\theta_1$. For purposes of explanation, assume $f_1$ is about 50 MHz. FIG. 3 also shows a plot of phase data acquired using a slightly lower second modulation frequency $f_2$, data for which is denoted $\theta_2$. For purposes of explanation, assume $f_2$ is about 31 MHz, and according its slope is less than that of the $f_1$ waveform, and its period (or aliasing interval range) is longer. For these exemplary values of $f_1$ and $f_2$, a typical value of $f_m$ for system 200 might be 70 MHz. The $f_2$ waveform is drawn with a heavier line than the $f_1$ waveform to promote clarity in the figure. As was the case with the plot described in FIG. 1D, at phase multiples of $2\pi$ the data folds-over or wraps around. The wrap-around somewhat complicates the calculations of $\theta_E$ and $\theta_{DS}$ as noted later herein.

As noted, one aspect or goal of the present invention is provide a large aliasing interval range $Z_{AIR}$ by making it appear as though system 200 acquire phased phase data using a relatively low modulation frequency. The following description will demonstrate that defining a difference frequency $f_D$ that preferably is a function of $f_1$ and $f_2$ and defining a phase difference $\theta_D = (\theta_1 - \theta_2)$ will achieve the goal of providing a low modulation frequency suitable for a large aliasing interval range. Without limitation, an exemplary function for $f_D$ may be a difference function $(a \cdot f_1 - b \cdot f_2)$, where a and b may be weighting factors.

Mathematically, phase delay $\theta$ may be expressed in terms of absolute target distance Z as:

$$\theta = 2\pi \left( \frac{2fZ}{C} + N \right) \quad (5)$$

Differentiating equation (5) yields:

$$\delta\theta = \frac{4\pi Z \delta f}{C} \quad (6)$$

Therefore the absolute (dealiased) distance $Z_{ABS}$ is given by:

$$Z_{ABS} = Z = \frac{C}{4\pi} \frac{\delta\theta}{\delta f} \quad (7)$$

In this instance, the differential in equation (7) can be replaced with small differences without loss of precision, to yield:

$$Z = \frac{C}{4\pi} \frac{\Delta\theta}{\Delta f} \quad (8)$$

Equation (8) shows that Z can be determined from $\Delta\theta$, which is $\theta_D$ or (or $\theta_1 - \theta_2$) and from $\Delta f$. Note that this is the same equation one would use to determine Z from a modulation frequency $\Delta f = f_D = f_1 - f_2$ and phase $\Delta\theta = \theta_D = \theta_1 - \theta_2$. Thus with knowledge of $f_1$, $f_2$, $\theta_1$, $\theta_2$, one can compute a measurement for distance Z that is akin to a calculation for Z where the actual modulation frequency was physically $(f_1 - f_2)$. This aspect of the present invention is thus the combination of modulation frequencies $f_1$ and $f_2$ that will yield a large aliasing interval range, as though system 200 were acquiring phase data while operating at a very low modulation frequency. Of course many other combinations of $f_1$ and $f_2$ could be used to achieve this goal, and one could employ more than two modulation frequencies, e.g., $f_1$, $f_2$, $f_3$, .... Preferably the highest of these modulation frequencies $f_1$ would be close to the system highest maximum modulation frequency $f_m$ and at least within 40% of $f_m$. Preferably at least the closest together of the various modulation frequencies would be within about ±35% of each other, and preferably closer together than that.

Preferably maximum modulation frequency $f_m$ is close to, the optimal operating point for TOF system 200. This means that $f_m$ is near a maximum of operating efficiency, and therefore curve of system operating efficiency is relatively flat in the vicinity of $f_m$. Generally this maximum is quite flat and therefore operating frequencies $f_1$ and $f_2$ will also be close to the optimal operating conditions for system 200.

Design consideration in implementing a high effective (e.g., virtual) modulation frequency commensurate with a desired low level of Z resolution uncertainty will now be presented. In this aspect of the present invention, phase data obtained from system 200 operating at modulation frequencies $f_1$ and $f_2$ are combined to yield an effective (virtual) frequency measurement at frequency $f_E$. Rather than use data obtained from system 200 operating at modulation frequency $f_1$ alone, or at modulation frequency $f_2$ alone, the present invention advantageously combines data acquired at both modulation frequencies to further lower uncertainty in the Z data. (It is understood that if additional modulation frequencies are used, e.g., $f_3$, $f_4$, ... phase data acquired while system 200 was operating at these modulation frequencies would also preferably be used).

Combining phase data from all modulation frequencies used (e.g., $f_1$ and $f_2$ in the example at hand) averages noise in the phase data measurements, and advantageously results in lower noise than would be obtained using data acquired solely from $f_1$ or $f_2$ alone. Furthermore, because modulation frequencies $f_1$ and $f_2$ are preferably relatively close to maximum modulation frequency $f_m$, each measurement is obtained with relatively high precision and lowered noise. In general for close together frequencies $f_1$ and $f_2$, system 200 performance will be somewhat similar. Advantageously, uncertainty obtained after combining data from frequency $f_1$ and $f_2$ will be about 0.7 times the uncertainty when phase data acquired using modulation frequency $f_1$ or modulation frequency $f_2$ was used alone.

Thus this second aspect of the present invention relates to combining phase data acquired by system 200 operating at different (but preferably close to each other) modulation frequencies so as to emulate system operation at a high modulation frequency that yields a low Z resolution uncertainty. While some specific methods of combining data will now be described, it is understood that many other combinations could also be used.

With respect to this second aspect or goal, one approach is to combine that raw data readings from pixel detectors 140 in array 130 (see FIGS. 2A and 2B) from captures ($C'_0$, $C_1^{90}$, $C_1^{180}$, $C_1^{270}$) obtained at modulation frequency $f_1$ and add this raw data to data readings ($C_2^0$, $C_2^0$, $C_2^{180}$, $C_2^{180}$) obtained at a frequency $f_2$ to produce ($C_1^0 + C_2^0$, $C_1^{90} + C_2^0$, $C_1^{180} + C_2^{180}$, $C_1^{270} + C_2^{180}$). This exemplary combination is equivalent to adding the respective phase vectors together in a polar representation and obtaining the phase angle for the sum vector.

Figure 1E:
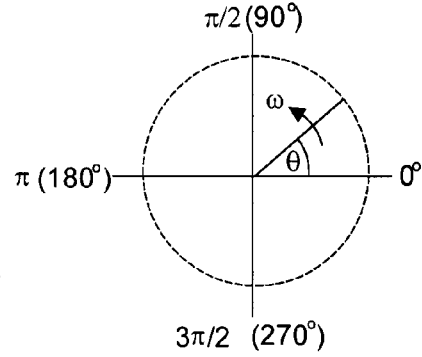
FIG. 1E is a polar representation of acquired phase data as a function of modulation frequency, according to the prior art.

Consider now a polar representation of the phase vector for a target object 20 at a given distance Z, acquired by system 200 operating at modulation frequency $f_1$ or at modulation frequency $f_2$. (FIG. 1E may be regarded as a polar representation for a single phase vector.) The phase vectors may be represented in polar form as $V_1 = (\rho, \theta_1)$ and $V_2 = (\rho, \theta_2)$ for captures at modulation frequencies $f_1$, $f_2$ respectively. For ease of explanation it will be assumed that the small change in modulation frequency does not affect modulation contrast, and hence both $V_1$ and $V_2$ have the same magnitude $\rho$. (The term "modulation contrast" denotes a measure of collection efficiency within pixel detectors 140, e.g., how well incoming photon energy from signal $S_{in}$ is captured and converted into a detection signal. A high modulation contrast is desirable.)

Adding phase vectors $V_1 = (\rho, \theta_1)$ and $V_2 = (\rho, \theta_2)$ yields:

$$V_1 + V_2 = (2\rho \cdot \sin((\theta_1 - \theta_2)/2), (\theta_1 + \theta_2)/2) \qquad (8)$$

Thus if $(\theta_1 - \theta_2)$ is not a multiple of $\pi$, the phase of $V_1 + V_2$ that would make the vector null will be the same phase $(\theta_1 + \theta_2)/2$ as the phase vector for target object 20 measured at modulation frequency $(f_1 + f_2)/2$. In practice, however, modulation contrast varies with frequency, which complicates implementation of this addition method. A further complication is variation in modulation contrast ratio with temperature, which makes the mathematics somewhat unwieldy.

In an alternate embodiment, actual phase angles from the two measurements $\theta_1$ and $\theta_2$ at modulation frequencies $f_1$ and $f_2$ are themselves combined to produce an effective phase angle $\theta_E$. Typically the average $(\theta_1 + \theta_2)/2$ of the phase angles is used, although other combinations of the actual phase angles are possible.

As noted above, values for $\theta_E$ and $\theta_D$ may be determined in a variety of ways, within the scope and spirit of the present invention. Regardless of the specific method used to obtain these values, preferably $\theta_E$ and $\theta_D$ are both used to determine distance Z, as shown by FIG. 3. FIG. 3 depicts phase angles $\theta_1$, $\theta_2$, $\theta_D = \theta_1 - \theta_2$ and $\theta_E = (\theta_1 + \theta_2)/2$ associated, respectively, with frequencies $f_1$, $f_2$, $f_D = (f_1 - f_2)$, and $f_E = (f_1 + f_2)/2$. It is noted that $\theta_1$ and $\theta_2$ are normalized so as to be 0 for Z=0. FIG. 3 also depicts $\theta_{DS}$, which may be derived from $\theta_D$ as $\theta_{DS} = \theta_D \cdot f_E / f_D$. Angle $\theta_{DS}$ corresponds to the same frequency as $\theta_E$ and thus has the same slope as $\theta_E$ as shown in FIG. 3. However because angle $\theta_{DS}$ is mathematically derived from $\theta_D$, it advantageously has the same large aliasing interval as $\theta_D$, denoted $Z_{AIR}$.

Note that both $\theta_D$ and $\theta_E$ are adjusted to take account the foldover or wrap around repetitions of $\theta_1$ and $\theta_2$. For example, before the end of the first aliasing interval of $\theta_E$, $\theta_1$ wraps around. Simply computing $\theta_E = (\theta_1 + \theta_2)/2$ would not suffice because $\theta_E$ would decrease by $\pi$ when $\theta_1$ wraps around. However when $\theta_1 < \theta_2$, it is known that $\theta 1$ must have wrapped around, and hence $\pi$ must be added to $\theta_E$. Such trigonometric corrections are well known in the art and are assumed to have been performed on the data.

Having thus appropriately trigonometrically corrected $\theta_E$ and $\theta_D$, since $\theta_{DS}$ and $\theta_E$ have the same slope and differ only by their aliasing interval, in the absence of noise it follows that $\theta_{DS} = \theta_E + K2\pi$. K is an integer that represents the index of the aliasing interval of $\theta_E$. In the presence of noise, $\theta_{DS} \cong \theta_E + K2\pi$. Finding the correct aliasing interval involves selecting K so as to minimize the absolute value of $(\theta_{DS} - \theta_E + K2\pi)$. $\theta_E + K2\pi$ then represents an accurate measure of Z, but with unknown aliasing interval. The expression $\theta_E + K2\pi$ represents the dealiased value of $\theta_E$. It is of course assumed that the target object is at a distance less than the aliasing interval for $f_D$. It is understood that other equivalent mathematical approaches to determine suitable values for K may also be employed.

It is important to select an appropriate difference frequency $f_D$. If $f_D$ is too big, the corresponding dealiasing interval for $f_D$ may be too small. Conversely, if $f_D$ is too small, then resolution certainty in Z measurements at $f_D$ can become too large. Thus, difference frequency $f_D$ should be as small as possible, subject to the noise constraints affecting resolution uncertainty. The aliasing interval index K should be determined with high certainty to ensure the proper dealiasing interval is selected.

If it assumed that $f_D \ll f_E$, then error$(\theta_{DS}) \gg$ error$(\theta_E)$ and one can generally neglect error from $\theta_E$. Let $K_s = ((\theta_{DS} - \theta_E)/2\pi$. Then K is the closest integer to $K_s$. To find the correct K, the error on $K_s$ must be $\ll 0.5$, which means the error on $\theta_{DS}/2\pi T = \theta_D \cdot f_E / f_D / 2\pi$ must also be substantially less than 0.5.

The following section will now describe exemplary approaches to identifying good capture sequences for modulation frequencies $f_1$ and $f_2$. Many different capture sequences may be used to generate dealiased frames. A frame represents a complete Z image acquired by sensor array 130, which is to say that each pixel detector 140 in the array is associated with a corresponding Z value from target object 20. Assume first that pixel detectors 140 in system 200 can only achieve one capture at a time. Under this assumption, some exemplary sequences are as follows.

Figure 4A:
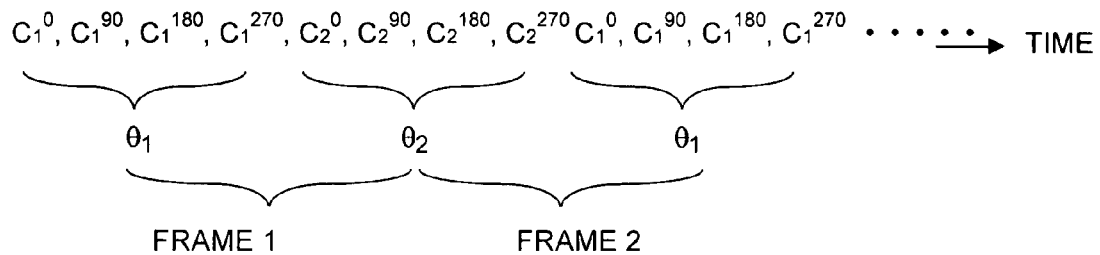
FIG. 4A depicts a sequence of eight different captures from one pixel detector, as well as resultant phase shift and frame construction, according to an embodiment of the present invention.

A first case is depicted in FIG. 4A, where it is assumed that the same pixel detector is sequenced though eight different captures to acquire the desired phase shift data $\theta_1$, $\theta_2$. Thus as shown in FIG. 4A, with system 200 operating at modulation frequency $f_1$ a sequence of captures $C_1^0$, $C_1^{90}$, $C_1^{180}$, $C_1^{270}$ is acquired over time. Next, with system 200 operating at modulation frequency $f_2$, a sequence of captures $C_2^0$, $C_2^{90}$, $C_2^{180}$, $C_2^{270}$ is acquired, after which the system is returned to operating at modulation frequency $f_1$ and a sequence of captures $C_1^0$, $C_1^{90}$, $C_1^{180}$, $C_1^{270}$ is made, and so on. Thus in FIG. 4A (as well as in FIGS. 4B-4D), the phase information displayed beneath the relevant sequence of captures is the phase data acquired by system 200 operating at the associated modulation frequency. Thus it is understood that subscript 1 denotes captures associated with modulation frequency $f_1$ and subscript 2 denotes captures associated with modulation frequency $f_2$. The frame information displayed beneath the phase information shows how frames are preferably constructed, according to the sequence shown. Once $\theta_1$ and $\theta_2$ have been determined, $\theta_E$ can be calculated from $(\theta_1+\theta_2)/2$.

Figure 4B:
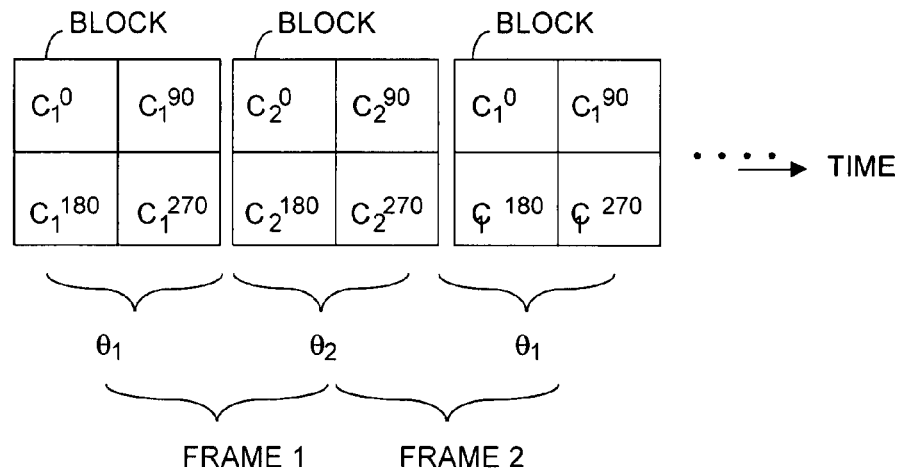
FIG. 4B depicts a sequence in which four adjacent pixel detectors acquire four phases in a single capture, as well as resultant phase shift and frame construction, according to an embodiment of the present invention.

FIG. 4B depicts another sequencing example, in which four adjacent pixel detectors, shown as a block, in the pixel array are used to acquire all four phases in a single capture. Whereas the eight capture sequence of FIG. 4A is susceptible to motion blur due to the length of time to acquire all eight captures, the sequence shown in FIG. 4B should inherently exhibit lower motion blur. But in FIG. 4B, the $C^0$–$C^{180}$ offset cancellation is done with data from different pixels and performance can suffer in that offsets are not fully cancelled. As before, $\theta_E$ is calculated from $(\theta_1+\theta_2)/2$.

Figure 4C:
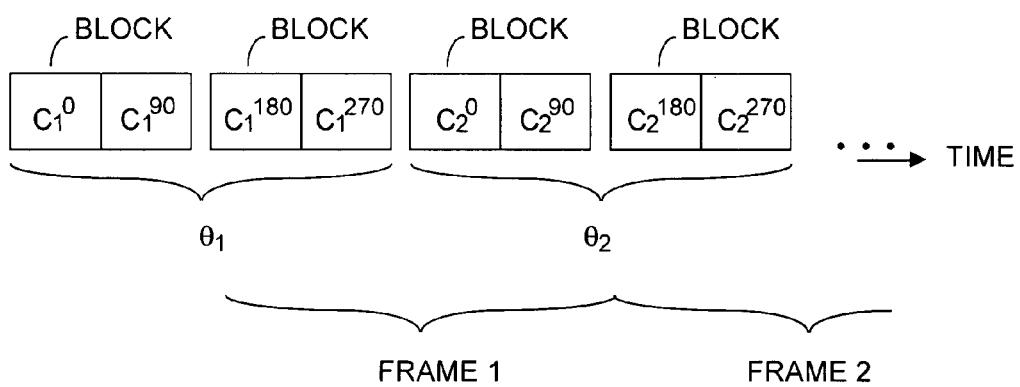
FIG. 4C depicts a sequence in which captures for each phase are offset-cancelled using data from the same pixel detector, as well as resultant phase shift and frame construction, according to an embodiment of the present invention.

FIG. 4C depicts yet another sequencing example, one in which captures for each phase are cancelled with respect to $C^0$–$C^{180}$ offset with the same pixel detector, shown as a block. In this configuration, performance is quite good, and motion blur is acceptable. As before, $\theta_E$ is calculated from $(\theta_1+\theta_2)/2$.

FIG. 4D depicts an alternative embodiment in which phase $\theta_1$ and phase $\theta_2$ are not $C^0$–$C^{180}$ offset corrected. As a result, data quality is somewhat poor, but advantageously $\theta_E$ is computed directly from the captures $C_1^0$–$C_2^{180}$ and $C_1^{90}$–$C_2^{270}$. The method is as described previously, where $C_2^{180}$ is substituted for $C_2^0$ and where $C_2^{270}$ is substituted for $C_2^{90}$. Advantageously, data quality for $\theta_E$ is good but $\theta_D=\theta_1-\theta_2$ is of poor quality and as a result the dealiasing interval decision quality suffers.

An alternative embodiment, not depicted explicitly, is similar to that of FIG. 4D, but wherein $\theta_E$ is calculated from $(\theta_1+\theta_2)/2$. As noted earlier, acquired phase angles preferably are normalized to start at zero for Z=0. In the alternative embodiment at hand, if pre-normalization differences between $\theta_1$ and $\theta_2$ are small, then offset induced errors in $\theta_1$ and $\theta_2$ will be opposite of each other and will advantageously partially cancel out in $\theta_E=(\theta_1+\theta_2)/2$. If O is the assumed small offset, then from equation (4), $\theta_1=\mathrm{atan2}(C_1^0+O, C_1^{90}+O)$ and $\theta_2=\mathrm{atan2}(-C_2^{180}+O, -C_2^{270}+O)$. If modulation contrast is similar for both modulation frequencies $f_1$ and $f_2$, and $\theta_1\approx\theta_2$, then $C_1^0\lesssim C_2^{180}$ and $C_1^{90}\approx C_2^{270}$. Thus, $\theta_1\approx\mathrm{atan2}(C_1^0+O, C_1^{90}+O)$ and $\theta_2\approx\mathrm{atan2}(C_1^0-O, C_1^{90}-O)+\pi$. As such, phases $\theta_1$ and $\theta_2$ move in opposite directions in roughly equal amounts with respect to offset O. Thus, advantageously the effect of offset O will be partially cancelled in the sum $\theta_E=(\theta_1+\theta_2)/2$. In some advanced TOF systems, the time of flight pixels can acquire more than one phase or modulation frequency at each capture. For example such multiphase-capture pixels effectively function as through they simultaneously capture $C_1^0$ and $C_1^{90}$. Such effective functionality may be implanted, for example, by rapidly time-slicing or time-multiplexing between different modulation frequencies and/or phases, or by using multiple detectors operating at different modulation frequencies and/or phases. Using such pixels, the time to assemble sequences for a dealiased frame is considerably shortened. The basic methodology described earlier herein remains the same.

Thus far, the various described dealiasing embodiments have been lossless, e.g., dealiasing was carried out with a very small TOF system performance penalty. A lossy so-called least common multiple (LCM) dealiasing embodiment will now be described reference to FIGS. 5A and 5B. In FIGS. 5A and 5B, two distance measurements are made using two modulation frequencies $f_1$ and $f_2$, for which frequencies $Z_{AIR1}$ and $Z_{AIR2}$ represent the associated maximum unambiguous aliasing interval ranges. In FIG. 5A, $f_1$ is 25 MHz, and $Z_{AIR1}$ is 3 M, while in FIG. 5B, $f_2$ is a lower 18.75 MHz, and $Z_{AIR2}$ is a longer 4 M. Assume a target object is present 7 m from the TOF sensor array. If a single modulation frequency $f_1$=of 25 MHz is used to acquire data, one can infer that the Z distance of the object is either 1 m, 4 m, 7 m, or 12 m as suggested by the cross-hatched rectangular regions in FIG. 5A. On the other hand, if a single modulation frequency $f_2$=18.75 MHz is used, one can infer the target object is at 3 m, 7 m, or 11 m, as suggested by the cross-hatched rectangular regions in FIG. 5B.

According to the LCM embodiment, the above-two results are combined, leading to the conclusion that the target object must be at a distance of 7 m. The target object is drawn in FIGS. 5A and 5B with heavy bold lines to distinguish from phantom locations, which are drawn in phantom. The true location of the target object could still be confused with another location at 19 M, but compared to the one-modulation frequency case, the use of two modulation frequencies has extended the unambiguous interval range substantially. According to the present invention, if two modulation frequencies are used, the effective unambiguous interval range is increased according to the LCM least common multiple of $Z_{AIR1}$ and $Z_{AIR2}$. One strategy in selecting modulation frequencies is to maximize the LCM of the corresponding unambiguous interval ranges by choosing two frequencies close to each other.

Another embodiment of the present invention provides a lossy so-called branch and bound hierarchical approach to dealiasing. According to this embodiment, a relatively very low modulation frequency may be used to determine whether a target object is within a first or a second Z range or bin, e.g., perhaps between a 0 m to 50 m range, or perhaps between a 50 m to 100 m range. If TOF system 200 determines that the target object is within say 0 m to 50 m, then software 200 can cause clock 180' to double the modulation frequency to determine whether the target object lies within a 0 m to 25 m sub-range (or narrower bin), or within a 25 m to 50 m sub-range (or narrow bin). A similar analysis and modulation frequency change is performed should the object initially have been found to lie with a 50 m to 100 m range. This method of estimating distance range for the target object and then changing modulation frequency to better ascertain the distance range is repeated preferably until the range is determined with a desired range granularity. Again this method is preferably carried out automatically under command of software 220. Of course while this example assumed the various alternate ranges or bins were 2× apart, other ratios may be used.

During a branch and bound hierarchical dealiasing process it is not necessary to obtain full certainty (e.g., best granularity) at each modulation frequency. For lower modulation frequencies it can suffice to obtain lower resolution. For example to decide between the 0 m to 50 m, and 50 m to 100 m ranges or bins, a fairly coarse level of resolution is sufficient. For example, if a highest quality depth image acquired by system 200 uses say ten bits, a fairly coarse level of resolution may only require three to four bits of resolution. Advantageously therefore captures at low modulation frequency may have short shutter times to reflect these relaxed requirements. In general for a hierarchical sweep of modulation frequencies, e.g., 1 MHz, 10 MHz, 100 MHz, the shutter will be short for all but the highest swept frequency, here 100 MHz. So doing advantageously reduces the amount of integration time the sensor array is operated at low modulation frequencies, which further boosts effective performance.

Understandably, using branch and bound hierarchical dealiasing, it may be desirable to minimize the number of bins for each relatively low modulation frequency. In turn, the hierarchical modulation frequency sweep process tends to maximize the effective system TOF modulation frequency by keeping the resolution requirement at each lower modulation frequency as small as feasible. If desired, a branch and bound embodiment may be combined with lossless dealiasing embodiment at one or more steps in the hierarchical process.

The above description was directed to lossy hierarchical type dealiasing embodiments. A lossless hierarchical dealiasing embodiment will now be described. Earlier herein it was shown that $\theta_D \cdot f_E/f_D/2\pi$ should be substantially less than 0.5. In an embodiment where a very long aliasing interval is desired, use of relatively high modulation frequencies $f_1$ and $f_2$ yield an $f_E/f_D$ ratio that becomes very large, making it difficult to keep $\theta_D * f_E/f_D/2\pi \ll 0.5$. For such applications, a lossless dealiasing method may also be applied hierarchically. In this fashion, at each step in the hierarchical process, as governed by noise consideration and as controlled by software 220, the ratio $f_E/f_D$ is kept relatively small.

Consider the following example, in which modulation frequencies $f_a$=100 MHz, $f_b$=110 MHz, $f_c$=111 MHz are used, and wherein there are defined difference frequencies $D_1$=$f_b$−$f_a$=10 MHz, $D_2$=$f_c$−$f_a$=11 MHz., and hierarchically applied difference frequency $E_1$=$D_2$−$D_1$=1 MHz.

In a so-called top-down sweep, initially frequency $E_1$ is used to dealias acquired phase data for $D_1$ and for $D_2$. In this initial step, $f_1$=$D_1$, $f_2$=$D_2$ and $f_D$=$E_1$. The ratio $f_E/f_D$ advantageously is not too large, here approximately 10. Thus, in this example, dealiased Z values may be found for an effective frequency $\theta_E$=($\theta_1$+$\theta_2$)/2.

Going down one step in the hierarchical process, the above found and dealiased value of $\theta_E$ will now be used in the current step as dealiasing phase $\theta_D$ for effective frequency 0.33($f_a$+$f_b$+$f_c$) and effective phase $\theta_E$=0.33($\theta_a$+$\theta_b$+$\theta_c$). Advantageously, it is noted that the ratio $f_E/f_D$ remains relatively small, here approximately 10. In this fashion, as the bottom of the hierarchy, $\theta_E$ is 0.33(100 MHz+110+111 MHz), i.e., close to 100 MHz, yet is has been dealiased as though its frequency were $E_1$=1 MHz, with $Z_{AIR}$ of about 150 M.

In addition, it is noted that TOF system 200 is not necessarily physically acquiring phase data with a modulation frequency $f_c$=111 MHz. Frequency $f_c$ may be computed mathematically, for example as $f_c$=(110 MHz+100 MHz/100), e.g., $f_b$+($f_a$)/100. Thus only frequencies $f_a$ and $f_b$ need to be physically measured by the TOF system.

In summary, dealiasing according to several embodiments of the present invention is lossless, and advantageously provides a relatively large aliasing interval range commensurate with a low modulation frequency, while also providing high precision certainty with respect to a given Z value, commensurate with a modulation frequency close to the highest modulation frequency $f_m$. According to the present invention, dealiasing may be carried out relatively losslessly, or in other embodiments, with loss.

Modifications and variations may be made to the disclosed embodiments without departing from the subject and spirit of the invention as defined by the following claims.

What is claimed is:

1. A method of dealiasing distance Z range of a phase-type time of flight (TOF) system operable at a maximum modulation frequency $f_m$, comprising the following steps:

(a) acquiring data from said TOF system using at least a first modulation frequency $f_1$ and using a second modulation frequency $f_2$, wherein operation of said TOF system solely at $f_1$ would yield an aliasing interval range of $Z_{AIR1}$, and operation of said TOF system solely at $f_2$ would yield an aliasing interval range of $Z_{AIR2}$, where $Z_{AIR2}$>$Z_{AIR1}$; and (b) processing phase data acquired at step (a) so as to cause said TOF system to provide an effective aliasing interval range $Z_{AIRD}$, where $Z_{AIRD}$>$Z_{AIR2}$>$Z_{AIR1}$, said $Z_{AIRD}$ corresponding to operation of said TOF system at an effective dealiasing frequency $f_D$ that is proportional to: $A \cdot f_1 - B \cdot f_2$, where A and B are weighting factors, and to provide Z resolution certainty exceeding what said TOF system produces by processing data acquired solely while operating at said modulation frequency $f_1$ and disregarding data acquired at said modulation frequency $f_2$, and to provide Z resolution certainty exceeding what said TOF system produces by processing data acquired solely while operating at said modulation frequency $f_2$ and disregarding data acquired at said modulation frequency $f_1$.

2. The method of claim 1, wherein at step (b) said weighting factors have a characteristic selected from a group consisting of (i) A and B are both positive, (ii) A and B are both negative, and (iii) A and B have opposite signs.

3. The method of claim 2, wherein at step (b) $f_d \ll f_m$.

4. The method of claim 1, wherein at step (b) said TOF system acquiring data at an effective operating modulation frequency $f_E$ where $f_2 < f_E \leq f_m$.

5. The method of claim 1, wherein at step (a), said first modulation frequency $f_1$ is within a range of about 60% to 100% of said maximum modulation frequency $f_m$.

6. The method of claim 1, wherein at step (a), said second modulation frequency $f_2$ is within a range of about 35% to 99% of said first modulation frequency $f_1$.

7. The method of claim 1, wherein said TOF system includes an array of pixel detectors, and wherein step (a) includes obtaining said data from said pixel detectors that are adjacent each other in said array.

8. The method of claim 1, wherein said TOF system includes an array of pixel detectors, and wherein step (a) includes obtaining said data from said pixel detectors sequentially in time.

9. The method of claim 1, wherein step (a) is carried out such that offsets associated with said data acquired at said first modulation frequency $f_1$ are at least partially cancelled using said data acquired at said second modulation frequency $f_2$.

10. The method of claim 1, wherein step (b) is carried out hierarchically.

11. A dealiasing subsystem to dealias distance Z range, useable with a phase-type time of flight (TOF) system operable at a maximum modulation frequency $f_m$, the dealiasing subsystem comprising:

means for causing said TOF system to acquire data using at least a first modulation frequency $f_1$ and using a second modulation frequency $f_2$, wherein operation of said TOF system solely at $f_1$ would yield an aliasing interval range of $Z_{AIR1}$, and operation of said TOF system solely at $f_2$ would yield an aliasing interval range of $Z_{AIR2}$, where $Z_{AIR2}$>$Z_{AIR1}$; and means for processing phase data acquired by said TOF system to cause said TOF system to provide an effective aliasing interval range $Z_{AIRD}$, where $Z_{AIRD}$>$Z_{AIR2}$>$Z_{AIR1}$, $Z_{AIRD}$ corresponding to operation of said TOF system at an effective dealiasing frequency $f_D$ proportional to: $A \cdot f_1 - B \cdot f_2$, where A and B are weighting factors, and to provide Z resolution certainty exceeding what said TOF system produces by processing data acquired solely while operating at said modulation frequency $f_1$ and disregarding data acquired at said modulation frequency $f_2$, and to provide Z resolution certainty exceeding what said TOF system produces by processing data solely while operating at said modulation frequency $f_2$ and disregarding data acquired at said modulation frequency $f_1$.

12. The subsystem of claim 11, wherein said means for processing causes said TOF system acquiring data at an effective dealiasing frequency $f_D$ proportional to a function of $f_1$ and $f_2$.

13. The subsystem of claim 11, wherein said means for processing causes said TOF system to function as though it were acquiring data at an effective operating modulation frequency $f_E$ where $f_2 < f_E \leq f_m$.

14. The subsystem of claim 11, wherein said means for causing causes said TOF system to operate such that said first modulation frequency $f_1$ is within a range of about 60% to 100% of said maximum modulation frequency $f_m$.

15. The subsystem of claim 11, wherein said means for causing causes said TOF system to operate such that said second modulation frequency $f_2$ is within a range of about 35% to 99% of said first modulation frequency $f_1$.

16. The subsystem of claim 11, wherein said TOF system includes an array of pixel detectors, and wherein said means for processing causes said TOF system to obtain said data from said pixel detectors that are adjacent each other in said array.

17. The subsystem of claim 11, wherein said TOF system includes an array of pixel detectors, and wherein said means for processing causes said TOF system to obtain said data from said pixel detectors sequentially in time.

18. The subsystem of claim 11, wherein said means for causing causes offsets associated with said data acquired at said first modulation frequency $f_1$ are at least partially cancelled using said data acquired at said second modulation frequency $f_2$.

19. The subsystem of claim 11, wherein said means for processing functions hierarchically.

20. The subsystem of claim 11, wherein at least one of said means for causing and said means for processing includes at least one executable software routine on media.

* * * * *